Jan. 24, 1961　　　H. S. TOUPS, JR., ET AL　　　2,969,013
AUTOMATIC BALE TRIP MECHANISM FOR BAGASSE BALERS
Filed May 2, 1958　　　　　　　　　　　　　　3 Sheets-Sheet 1

INVENTORS
HARRY S. TOUPS JR.
LOUIS P. BRAUD
RICHARD H. BRAUD
BY *Garvey & Garvey*
ATTORNEYS Jan. 24, 1961    H. S. TOUPS, JR., ET AL    2,969,013
AUTOMATIC BALE TRIP MECHANISM FOR BAGASSE BALERS
Filed May 2, 1958    3 Sheets-Sheet 2
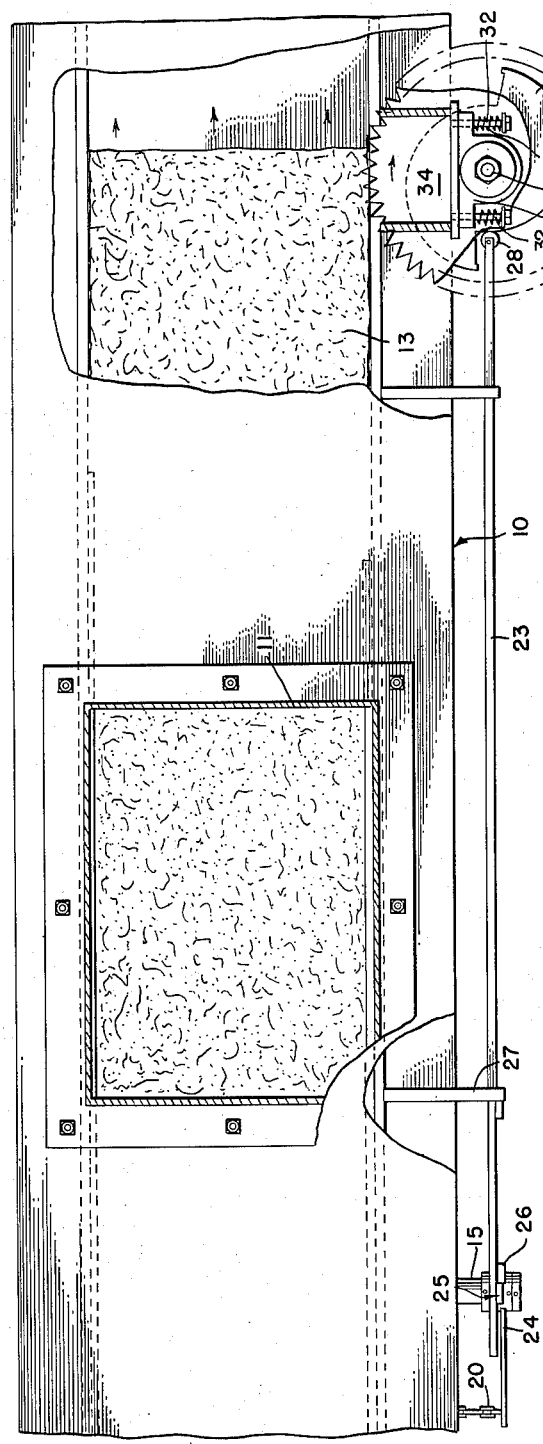
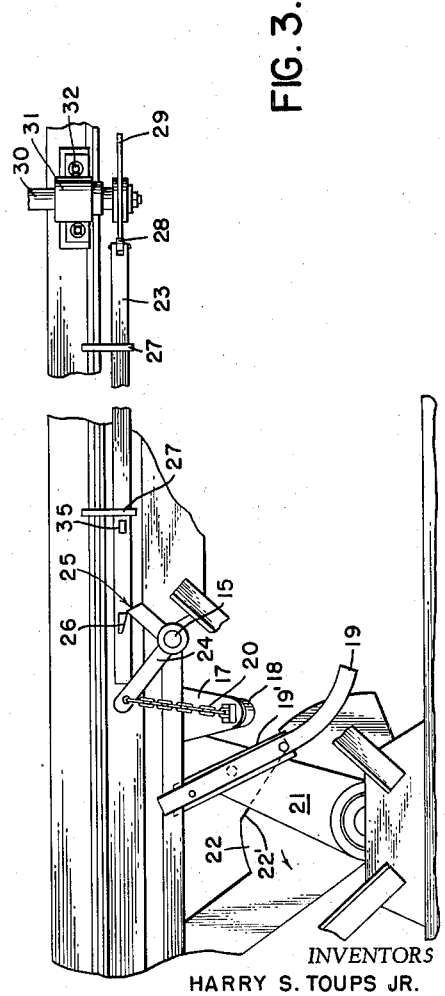
INVENTORS
HARRY S. TOUPS JR.
LOUIS P. BRAUD
RICHARD H. BRAUD
BY *Garvey & Garvey*
ATTORNEYS Jan. 24, 1961  H. S. TOUPS, JR., ET AL  2,969,013
AUTOMATIC BALE TRIP MECHANISM FOR BAGASSE BALERS
Filed May 2, 1958  3 Sheets-Sheet 3

INVENTORS
HARRY S. TOUPS JR.
LOUIS P. BRAUD
RICHARD H. BRAUD

BY *Garney & Garney*
ATTORNEYS

United States Patent Office 2,969,013
Patented Jan. 24, 1961

2,969,013

AUTOMATIC BALE TRIP MECHANISM FOR BAGASSE BALERS

Harry S. Toups, Jr., Louis P. Braud, and Richard H. Braud, Thibodaux, La., assignors to Thibodaux Boiler Works, Inc., Thibodaux, La., a corporation of Louisiana Filed May 2, 1958, Ser. No. 732,694

6 Claims. (Cl. 100—4)

This invention is an automatic bale trip mechanism for bagasse balers which is also adapted for use in baling loose fibrous materials of various miscellany. Bagasse, when baled, is moisture or liquid-impregnated, which presents problems not present in baling dried fibrous materials, such as hay, straw, or the like. Also, when the metering wheel of the baler is placed immediately ahead of the furthermost point of travel of the baler plunger, there is a periodical "kick back" with a conventional trip mechanism, which is detrimental in the baling operation. In addition, with conventional baling machines, variation in bale lengths occur, requiring manual adjustment, with a corresponding loss of time, in the baling operations. Because of its basic design, the presently used mechanism is inadequate for various reasons, including the lack of uniformity of the bales, even when the mechanism is in near perfect adjustment; the adjustment of the trip mechanism is too sensitive; there are too many parts to wear; slack and loose motion develop in the various links and many moving parts which results in faulty operation and much maintenance; presently used bagasse balers are designed so that the metering wheel is disengaged and reengaged with the bagasse each time it trips and a bale is made; and a new cycle is started for each bale and the metering wheel does not always return to the same starting point, resulting in bales of various lengths.

It is therefore an object of this invention to provide a continuous baling operation to positively form bales of average length, regardless of the rate of feed of material into the baler; to provide a simplified trip mechanism which may be substituted for the more complicated trip mechanisms of conventional balers; to provide a trip mechanism for bagasse balers which employs but a single spring in the trip entity and eliminates clutches and like means used over the years in mechanical balers; to provide a metering assembly, including a toothed or serrated wheel, the free terminals of the teeth being embedded at all times in the moving bagasse to positively actuate the wire threading mechanism of the baling machine, at predetermined intervals; and to provide a trip mechanism which requires no adjustment during operation and reduces the number of skilled workers to a minimum.

In actual practice we have found that the initial cost for the present mechanism is approximately one fourth the cost of conventional baler trip mechanisms and the required maintenance and attention during operation is correspondingly decreased. Furthermore, although the present metering wheel is dimensioned to form two bales per revolution, it is within the contemplation of this invention to adapt the metering unit to form as many bales as is desired per revolution, within practical physical limits.

Other objects of the invention will be manifest from the following description of the present preferred form of the invention taken in connection with the accompanying drawings, wherein:

Fig. 2 is a vertical sectional view of the same, showing the baler fragmentarily;

Fig. 3 is a side elevational view of the trip mechanism illustrating its application, showing the position of the trip mechanism after it has been operated to initiate action of the wire threading actuator assembly;

In conventional baling machines, the bagasse is fed into the baler by a series of overhead conveyors and chutes, which enter the baler through the top of the baler box. A reciprocating plunger compresses the bagasse and moves it in small increments until the bagasse is compressed to form a desired sized bale. The trip mechanism is used to activate needles which draw wire or other binding material through the baler box and thus determines the length of the individual bale. It is essential that the operation of the trip mechanism be extremely accurate, since otherwise bales of many different sizes are formed and manual intervention is necessary to make certain that the bales are not necessarily of the identical size, but a satisfactory average bale length. If the bales are processed in satisfactory lengths, they can be tiered to a considerable height and a cover placed over the top, without danger of the bales becoming loose and collapsing, as is frequently the case where conventional balers and trip mechanisms are employed. Over the years there has been much experimentation in this art, in order to provide a baler which would positively produce bales of satisfactory length for stacking or tiering, but without success. The present simple trip mechanism is the end result of much experimentation and positively processes bagasse bales of satisfactory length because the trip mechanism has been perfected to obtain optimum accuracy, employing a minimum number of parts including a single spring for the follower or throw bar hereinafter described. With the present invention, a trouble-free operation results, does not have to be constantly watched and never has to be adjusted. This, coupled with the great decrease in first cost and maintenance cost, has proven advantageous over all conventional types of bagasse balers. The simplicity of the present invention is stressed in attaining the objects of this invention and to solve the problems long recognized in the art including, in addition, improved stacking, referred to supra.

Figure 1:
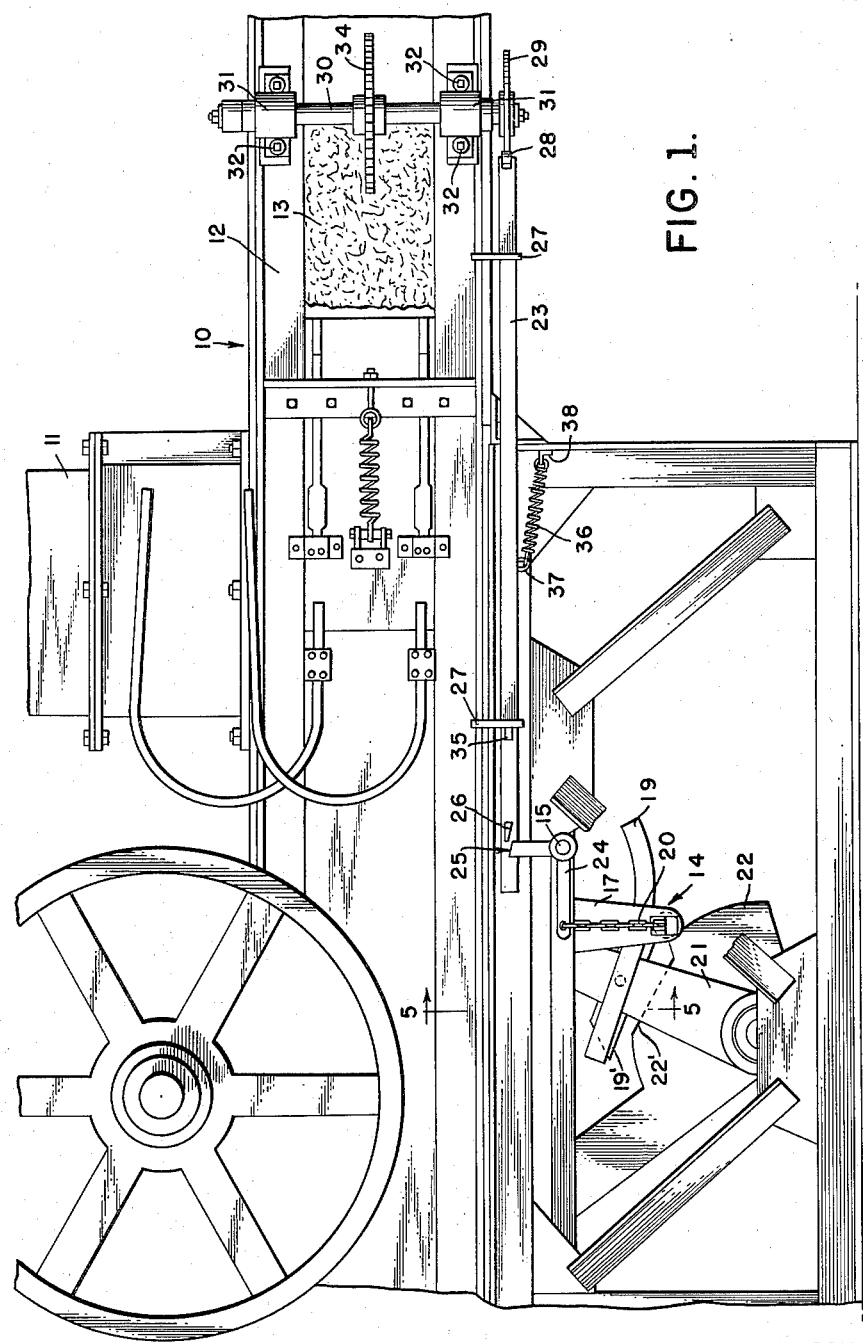
Fig. 1 is a side elevational view of trip mechanism constructed in accordance with the present invention, illustrating its application on a conventional mechanical baler.
Figure 4:
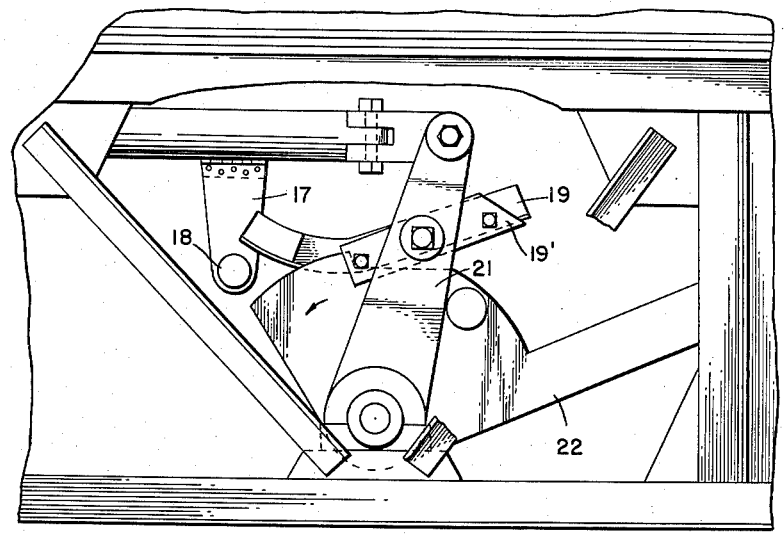
Fig. 4 is a fragmentary side elevational view of the conventional wire threading actuator assembly of the baler to which the trip mechanism is operatively connected.
Figure 5:
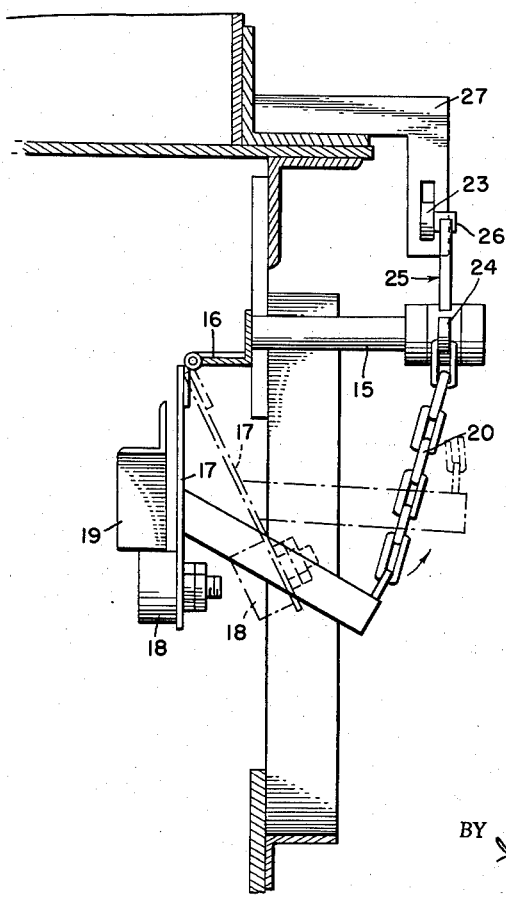
Fig. 5 is a rear elevational view of the same, dotted lines being used to show the position of the gravity trip of the wire threading actuator assembly after it has been actuated by the follower or throw bar of the trip mechanism.

In order to illustrate the application of this invention, there is shown a conventional baling machine 10 of the type manufactured by Thibodaux Boiler Works, Inc., which includes a stack 11 into which the bagasse is deposited, preparatory to moving into the chute or box 12 of the machine, bagasse 13 being shown in Figs. 1 and 2, following the conventional compression cycle. The baling machine also includes a wire threading actuator assembly 14 which includes a shaft 15 which extends laterally from the machine as shown to advantage in Fig. 5 and carries, at its inner end, a gravity trip, generally designated 16, which includes a hinge arm 17, a roller 18, the latter being adapted for coaction with a dog arm 19 and dog 19'. The hinge arm 17 is adapted to be actuated by flexible connection such as chain 20. The assembly further includes conventional coacting lever 21 and oscillating cam lever 22, the latter being provided with a recessed portion or notch 22' into which dog 19' drops, after movement of the gravity trip arm 17 has been initiated by the trip mechanism.

The trip mechanism includes a follower or throw bar 23, the aft end of which is in operative connection with the wire threading actuator assembly through a bell crank lever 24 rotatably mounted on shaft 15. Normally the bell crank lever is positioned as shown in Fig. 1 and includes vertical and horizontal portions, the free terminal of the vertical portion being beveled as indicated at 25. A wedge or protrusion 26 is formed on the outer face of the bar 23, the bottom edge of which is beveled to correspond to the bevel 25 of the bell crank lever, so that aft movement of the bar 23 will cause the protrusion to ride over the lever 24. The opposite or horizontal portion of the bell crank lever is engaged by the upper end of the chain 20. Forward movement of the bar 23 is adapted to rotate the bell crank lever in a clockwise direction in an obvious manner, when the protrusion 26 is positioned just in back of the vertical portion of said lever. The bar 23 is mounted to ride in guides 27 formed on the side of the machine. The forward end of the bar 23 is equipped with a follower 28 which is adapted to ride over the periphery of a cam 29, the latter being attached to one terminal of a shaft 30 mounted in bearings 31 carried by the baler box 12. The bearings 31 are yieldably mounted on the baler box through the means of bolts 32 on each of which a spring 33 is convoluted. The shaft 30 also carries a metering wheel 34 which, in the present instance, consists of a toothed wheel, the free ends of the teeth projectng into the box 12 so as to be in the path of movement of the bagasse 13 as the latter is pushed through the box. The toothed wheel is so positioned that there will be an appreciable penetration of the teeth into the bagasse to insure positive continuous operation of the trip mechanism. The bolts may be adjusted in an obvious manner so as to increase or decrease the pressure on the springs 33 and correspondingly vary the pressure on the toothed wheel. The bar 23 is equipped with a stop 35 just to the rear of the back guide 27, to prevent impact on the cam follower 28 when it drops in cam 29. The cam follower 28 of the trip arm is positively held in contiguity with the periphery of the cam 29 by a coil spring 36, one end of which is anchored to the bar 23, as indicated at 37, and the opposite end anchored to the baler, as indicated at 38.

When arm 17 is tripped, operation of the wire threading actuator assembly is effected in the same manner as heretofore in the baling machine manufactured by the Thibodaux Boiler Works, Inc. Roller 18 is disengaged from dog arm 19, allowing the latter to rotate about its pivotal connection with lever 21. One end of dog arm 19 gravitates downwardly until dog 19' drops into notch 22' of oscillating lever 22. This locks levers 21 and 22 together so that they move in unison. Movement of lever 21 actuates a system of levers and bars to pull the needles and baling wire of the wire threading assembly through baler box 12 to permit tying. In the meantime, gravity trip arm 17 returns to its normal vertical position by virtue of the forward movement of bar 23 and wedge 26 out of engagement with bell crank lever 24. Dog 19' is returned to its inoperative position by dog arm 19, which rides over roller 18 carried by gravity trip arm 17, upon clockwise rotary motion of levers 21 and 22 (see Fig. 1). This results in a counter-clockwise motion of dog 19', thereby raising one end thereof from notch 22'. This completes the cycle of operation.

The device of this invention has been found to solve the problem of processing bales in satisfactory average bale length through use of a simpler and more economical method of tripping the wire threading actuator assembly at predetermined intervals. The dog of this assembly, when released by the trip mechanism, actuates the yoke or other device which threads or pulls the baling wire or cord through the baler box to permit tying in the customary manner.

While we have, in the present invention, shown the cam 29 to be positioned on the lower end of the shaft 30, it is to be understood that this postion may be varied within the contemplation of the present invention and the cam may be single or multiple throw.

While we have herein described and shown our invention in its preferred form, it is nevertheless to be understood that various changes may be made therein, without departing from the scope and spirit of the claims hereto appended.

What we claim is:

1. In combination with a bagasse baling machine which includes a wire threading actuator assembly and a metering unit activated by movement of the bagasse through the machine, the actuator assembly including a gravity trip arm hingedly connected to the baling machine for normally maintaining the actuator assembly inoperative, and trip means for the actuator assembly operatively connected to the metering unit including a throw-bar, one end of which is normally held in operative engagement with the metering unit and the other end of which is located proximate the wire threading actuator assembly, said throw-bar being moved longitudinally by the metering unit at predetermined intervals, a protrusion carried by said throw-bar remote from the metering unit-engaging end thereof, the trip means further including a lever movably mounted on the machine and connected to said gravity trip arm, said lever lying in the path of, and being adapted to be moved by the protrusion on said throw-bar upon longitudinal movement of the latter, to actuate the gravity trip arm.

2. In combination with a bagasse baling machine which includes a wire threatening actuator assembly and a metering unit activated by movement of the bagasse through the machine, the actuator assembly including a gravity trip arm hingedly connected to the baling machine for normally maintaining the actuator assembly inoperative, and trip means for the actuator assembly including a throw-bar, one end of which is normally held in operative engagement with the metering unit and the other end of which is located proximate the wire threading actuator assembly, said throw-bar being moved longitudinally by the metering unit at predetermined intervals, a bell crank lever rotatably mounted on the baling machine, said lever lying in the path of, and rotated by, said throw-bar upon longitudinal movement of the latter, the trip means further including a flexible member connecting said bell crank lever to the gravity trip arm for actuating the latter upon rotation of the former.

3. The combination of claim 2, wherein a protrusion is carried by said throw-bar, which protrusion engages and actuates said bell crank lever.

4. In combination with a bagasse baling machine which includes a wire threading actuator assembly having a gravity trip arm hingedly connected to the baling machine for normally maintaining the actuator assembly inoperative, a metering unit mounted on the machine comprising a shaft, a coacting toothed metering wheel and cam mounted on said shaft operated by feeding bagasse through the machine, bearings in which the terminals of said shaft are rotatably mounted, spring-pressed bolts for connecting said bearings to the baling machine to yieldably urge said toothed metering wheel into the bagasse fed through the baling machine, and trip means for the wire threading actuator assembly operatively connected to the metering unit and including a throw-bar, one end of which is normally held in operative engagement with the cam of the metering unit, and moved longitudinally thereby at predetermined intervals, a protrusion carried by said throw-bar remote from the cam-engaging end thereof, the trip means further including a bell crank lever rotatably mounted on said baling machine, said lever lying in the path of, and rotated by, the protrusion of said throw-bar upon longitudinal movement of the latter, and a flexible member connecting said bell crank lever to the gravity trip arm for actuating the latter upon rotation of the former.

5. The combination of claim 4 wherein the bell crank lever includes vertical and horizontal portions, said flexible member being connected to the horizontal portion.

6. The combination of claim 5, wherein the free terminal of the vertical portion of the bell crank lever and the lever-engaging face of the throw-bar protrusion are correspondingly beveled so that aft movement of the throw-bar will cause the protrusion to ride over said bell crank lever.

References Cited in the file of this patent

UNITED STATES PATENTS

| | | |
|---|---|---|
| Re. 24,155 | Bornzin | May 22, 1956 |
| 1,027,868 | Madsen | May 28, 1912 |
| 2,651,252 | Pope | Sept. 8, 1953 |
| 2,701,517 | Havswirth | Feb. 8, 1955 |
| 2,735,359 | Tarbox | Feb. 21, 1956 |
| 2,807,996 | Barnes et al. | Oct. 1, 1957 |
| 2,822,749 | Nolt et al. | Feb. 11, 1958 |
| 2,859,686 | Hollyday et al. | Nov. 11, 1958 |

FOREIGN PATENTS

| | | |
|---|---|---|
| 162,825 | Australia | May 12, 1955 |
| 214,080 | Germany | Oct. 6, 1909 |